United States Patent

Eichelberger et al.

[15] 3,697,819
[45] Oct. 10, 1972

[54] ELECTRIC POWER DISTRIBUTION SUBSTATION

[72] Inventors: Charles D. Eichelberger, Ridley Park; Frank L. Musselman, Wayne, both of Pa.

[73] Assignee: General Electric Company

[22] Filed: Oct. 21, 1971

[21] Appl. No.: 191,238

[52] U.S. Cl. .................................317/103, 200/48 R
[51] Int. Cl. ..........................H02b 1/18, H01h 31/00
[58] Field of Search .200/48 R, 144 B, 145; 317/103, 317/112

[56] References Cited

UNITED STATES PATENTS 2,767,265  10/1956  Davidson ..................... 317/103
3,571,543  3/1971  Perkins ................... 200/144 B Primary Examiner—Lewis H. Myers
Assistant Examiner—Gerald P. Tolin
Attorney—J. Wesley Haubner et al.

[57] ABSTRACT

An incoming line compartment for an electric power distribution substation. The compartment comprises a metal housing containing incoming line equipment for connecting a high voltage line to the terminals of a transformer, for disconnecting it therefrom, and for providing certain fault protection and surge protection. The incoming line equipment comprises the following devices: high voltage cables entering the compartment from underground, an isolating switch suspended from a base near the roof of the metal housing, a vacuum switch, and means connecting these devices in series with each other and with the terminals of the transformer. The vacuum switch is horizontally spaced from the cables, and an inspection aisle extends between the vacuum switch and the cables beneath a horizontally movable blade of the isolating switch. This arrangement is especially compact and lends itself to being enclosed by a housing of relatively small size that leaves space for the necessary electrical clearances.

9 Claims, 5 Drawing Figures

ELECTRIC POWER DISTRIBUTION SUBSTATION

BACKGROUND

This invention relates to an electric power distribution substation which comprises electrical apparatus, such as a power transformer, and switching equipment for connecting a high voltage line to the high voltage terminals of the electrical apparatus. The invention is particularly concerned with a substation of this type in which the switching equipment and related protective equipment are enclosed within a compact, weatherproof metal housing. This housing is referred to hereinafter as the incoming line enclosure and the switching and protective equipment therein as the incoming line equipment.

The typical substation comprises a power transformer, an incoming high voltage line, and the following incoming line equipment on the high voltage side of the transformer: isolating switches through which the line is connected to the high voltage terminals of the transformer; lightning arrestors for protecting the transformer against damage from line surges; and protective devices, such as fuses, for interrupting the high voltage line in case of certain faults. The isolating switches, the lightning arrestors, and the protective devices are typically of outdoor designs and are supported in weather-exposed positions on tall outdoor structures which serve also to support the ends of the incoming high voltage line through suitable insulators or through suitable terminators, where the incoming line is an underground cable.

The disconnect switches are typically relied upon not only for isolating purposes but also for the interruption of transformer magnetizing currents. Because this type of interruption often involves establishing a relatively long arc in open air, extra large phase-to-phase and phase-to-ground clearances must be provided in the conventional substation to provide satisfactory electrical isolation between phases and from phase-to-ground. This means that a relatively large amount of ground space is consumed by the conventional incoming line equipment and that the insulators of such equipment must be relatively long.

In addition to the large amount of ground space consumed and the long insulators used, the supporting structure must be quite tall in order to provide the needed clearance to ground for personnel safety. All of these features combined with the exposed character of the incoming line equipment result in an overall appearance that is not very pleasing.

In addition, the incoming line equipment of the typical substation is exposed to inclement weather and is thus vulnerable to damage from lightning storms. Still further, for safety reasons, a typical substation with its exposed high voltage equipment must always be surrounded by a fence to keep unauthorized personnel from entering the area.

SUMMARY

An object of this invention is to locate all the incoming line equipment in an enclosed compartment requiring reduced ground space and height, allowing safer and more reliable operation relatively unaffected by weather conditions, and eliminating the necessity for a protective fence around the substation.

Another object is to arrange the incoming line equipment in such a manner that it can be enclosed by a compact, relatively small housing of pleasing appearance.

Another object is to construct the incoming line equipment in such a manner as to reduce the amount of on-site assembly work required to install the equipment.

In carrying out our invention in one form, we provide a housing into which a high voltage cable projects through its base for connection to apparatus terminal structure within said housing. Located within the housing and interposed between the terminal structure and said cable is the series combination of an isolating switch and a vacuum-type interrupting switch. The isolating switch comprises a switch base mounted near the roof of the housing and a blade mounted by insulating means for pivotal motion in a horizontal plane beneath the switch base. The vacuum switch comprises vacuum interrupters arranged one above the other in a location horizontally spaced from the cable. An inspection aisle extends between the cables and the vacuum switch in a location beneath the horizontal plane in which the blade moves. A barrier between the aisle and the cable blocks access to the cable from the aisle.

BRIEF DESCRIPTION OF DRAWinGS

For a better understanding of the invention, reference may be had to the following description taken in conjunction with the accompanying drawings, wherein:

FIG. 1 is a side elevational view partly in section of the incoming line compartment of a power distribution substation of the type schematically illustrated in FIG. 1a.

Figure 1:
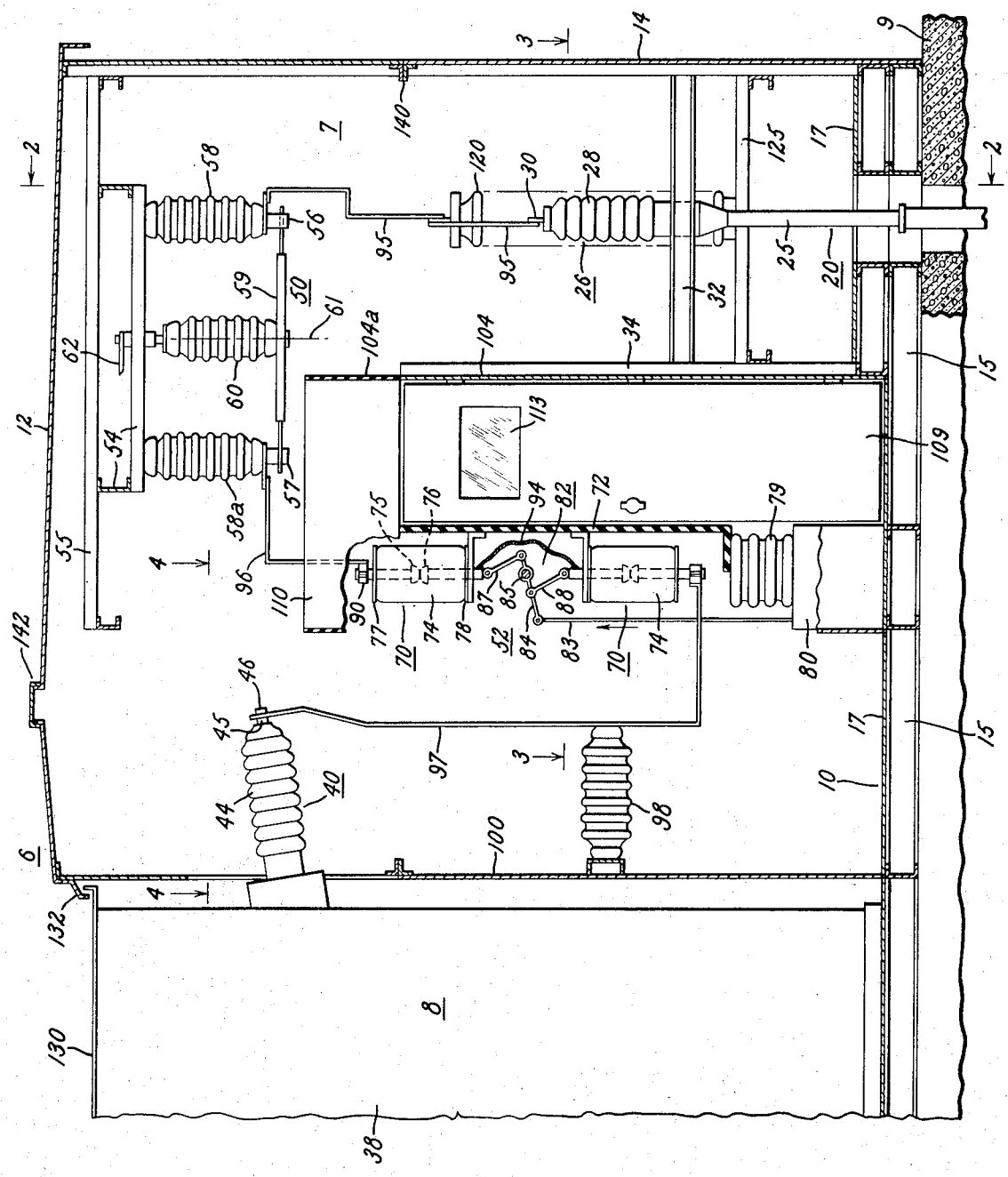
Figure 1A:
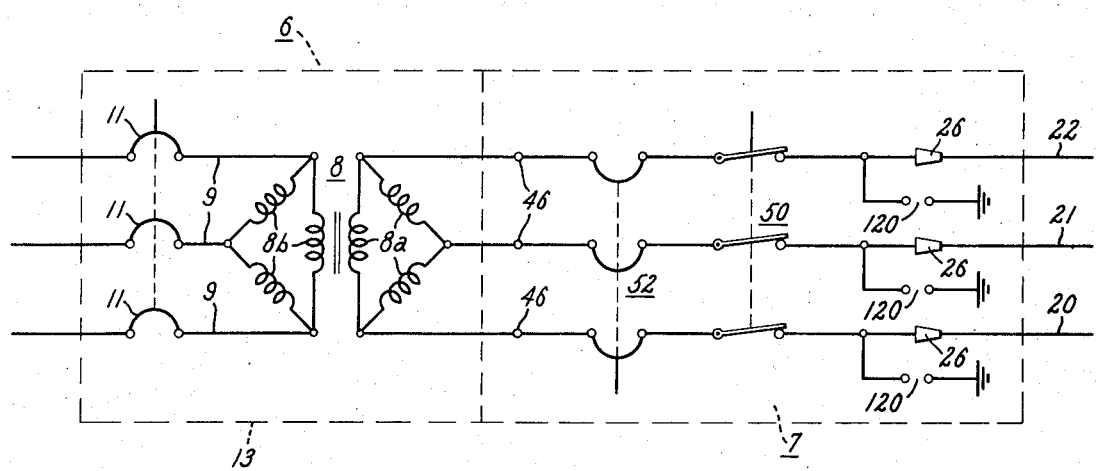
FIG. 1a is a schematic diagram in the nature of a wiring diagram showing a power distribution substation embodying one form of our invention.

DETAILED DESCRIPTION OF PREFERRED EMBODIMENT SCHEMATIC DIAGRAM OF FIG. 1a

Referring first to FIG. 1a, there is schematically shown a power distribution substation 6 comprising a three-phase power transformer 8 having high voltage terminals 46 to which an incoming three-phase high voltage line 20, 21, 22 is connected through terminators 26, an isolating switch 50, and an interrupting switch 52. The switches 50 and 52 are connected in series with each other and with the transformer terminals 46 and the incoming line 20, 21, 22. Connected between each conductor of the incoming line and ground is a lightning arrestor 120.

Transformer 8 comprises high voltage windings 8a and low voltage windings 8b inductively coupled together in a conventional manner. In the simplified form of substation depicted, the low voltage windings 8b are connected to a feeder circuit 9 containing a feeder circuit breaker 11. Feeder circuit breaker 11 is provided with suitable current responsive trip means (not shown) which is operable to automatically open circuit breaker 11 in the event of a fault on the feeder circuit.

All of the apparatus shown in FIG. 1a is housed within a metal enclosure schematically indicated at 13. One portion of this enclosure 13 is an incoming line compartment 7 in which is located the incoming line equipment 20, 21 and 22; 26, 50, 52, and 120.

INCOMING LINE COMPARTMENT DETAILS

Figure 2:
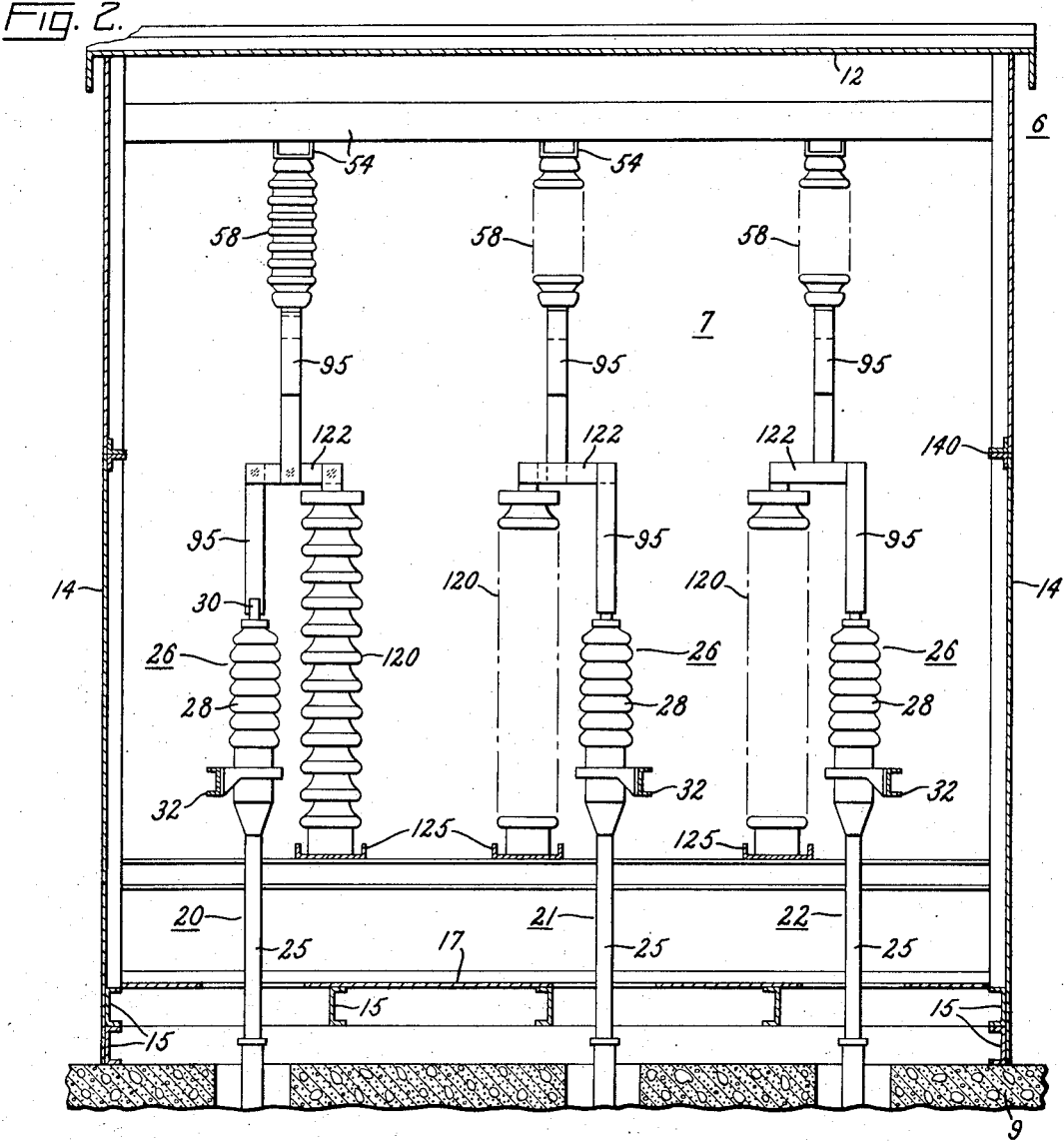
FIG. 2 is a sectional view along the line 2—2 of FIG. 1.

The incoming line compartment 7 and the incoming line equipment are shown in greater detail in FIGS. 1–4. Referring now to FIGS. 1 and 2, the illustrated incoming line compartment 7 comprises a base 10, a roof 12, and metal walls 14 extending vertically between the base and roof. Base 10 comprises a suitable framework of supporting beams 15 and a covering 17 preferably of metal. The framework 15 of the base rests on a concrete pad 19 to which it is anchored by suitable means not shown.

Extending upwardly through concrete pad 19 and through a suitable opening in base 10 are three spaced-apart incoming cables 20, 21 and 22. These cables are the phase conductors of the incoming three-phase high voltage line. Each cable is of a conventional form and, as such, comprises a high voltage conductor (not shown), a surrounding metal sheath 25 at ground potential, and suitable electrical insulating material between the conductor and sheath. Each cable terminates within a conventional cable terminator, or pot head, 26. Each of these terminators comprises a tubular insulating housing 28 through which the cable conductor extends upwardly to an electrical terminal 30. Each insulating housing 28 serves to mechanically support its associated high voltage terminal 30 and its associated high voltage cable conductor on a horizontal metal beam 32 and to electrically insulate these high voltage parts from the supporting beam 32. Supporting beam 32 is at ground potential and is suitably supported at its respective opposite ends on wall 14 and a vertical support 34 within the compartment 7.

TRANSFORMER 8

Figure 4:
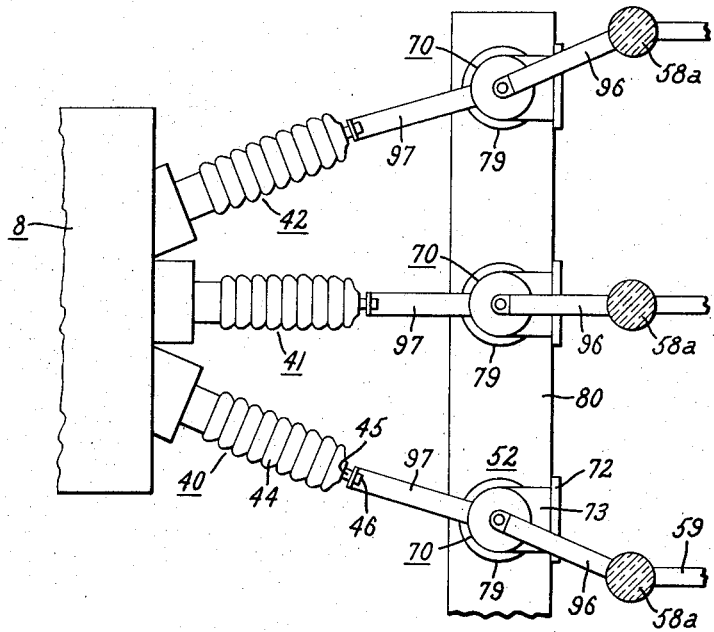
FIG. 4 is a sectional view taken along the line 4—4 of FIG. 1. The outer housing is omitted in FIG. 4.

Transformer 8 comprises a metal tank 38 and three spaced apart terminal bushings 40, 41 and 42 projecting through the sidewall of the tank near its upper end, as shown in FIGS. 1 and 4. The terminal bushings are of a conventional design; and as such, each comprises a hollow insulator 44 and a conductor 45 extending through the insulator into the interior of the tank 38. The outer end 46 of each conductor 45 may be thought of as a high voltage terminal of the transformer. In each phase of the power circuit, the transformer terminal 46 is connected to the cable terminal 30 through incoming line equipment within compartment 7. As was pointed out hereinabove relative to the schematic diagram of FIG. 1a, this incoming line equipment comprises an isolating switch 50 and a vacuum-type interrupting switch 52.

ISOLATING SWITCH 50

Isolating switch 50 comprises a base 54 mounted near roof 12 on horizontal beams 55. Isolating switch 50 further comprises three spaced-apart switching assemblies, one for each phase of the power circuit. The switching assemblies are substantially identical, and each comprises spaced-apart stationary contacts 56 and 57 respectively mounted on the lower ends of spaced-apart post insulators 58 and 58a. Insulators 58 and 58a are fixed to base 54 and mount the contacts 56 and 57 in horizontally spaced positions beneath base 54. In each switching assembly, a generally horizontally extending blade 59 interconnects contacts 56 and 57 when the switch is closed as shown in FIG. 1. Blade 59 is fixed to an insulator 60 at the lower end of insulator 60. Insulator 60 is suitably journaled on base 54 so as to be capable of rotating about its vertically disposed central axis 61 through an angle of about 60 degrees. When insulator 60 is so rotated, it pivots blade 59 in a generally horizontal plane from its closed position to an open position (shown in FIG. 3) displaced about 60 degrees from the closed position of FIG. 1. This serves to establish an isolating gap between each end of blade 59 and its associated stationary contact 56 or 57.

Each switching assembly of the isolating switch 50 has a blade corresponding to blade 59 and a blade-supporting insulator corresponding to insulator 60. The three insulators 60 are mechanically coupled together by a suitable linkage (partially shown at 62) located above the base 54 so that the three blades 59 move in unison from their closed to their open position during an opening operation. Similarly, they move in unison from their open to their closed position during a closing operation.

VACUUM-TYPE INTERRUPTING SWITCH 52

The vacuum-type interrupting switch 52 comprises three spaced-apart interrupting assemblies, one for each phase of the circuit. These interrupting assemblies are substantially identical and each comprises a plurality of vacuum interrupters 70 suitably supported one above the other on suitable insulating members, such as shown at 72 in FIGS. 1 and 3. In the schematically illustrated embodiment, horizontal metal plates 73 attached to the insulating member 72 are fixed to end caps 78 of the two interrupters 70.

The interrupters 70 are of a conventional design; and, as such, each comprises a highly evacuated envelope 74 within which are relatively movable contacts 75 and 76. Envelope 74 comprises a tubular housing of insulating material and metal end caps 77 and 78 sealed thereto. Contacts 75 and 76 are supported on conductive contact rods extending in sealed relationship through the end caps. Contact 76 is a movable contact, and its supporting rod is axially movable with respect to its associated end cap 78. A suitable metal bellows (not shown) provides a flexible seal between the end cap 78 and movable contact rod to permit such axial movement without allowing leakage into the envelope. For specific examples of suitable vacuum interrupters suitable for this duty, reference may be had to U.S. Pat. Nos. 3,522,399-Crouch, 3,441,698-Sofianek, or 3,163,735-Miller, all assigned to the assignee of the present invention.

The insulating support 72 for the vacuum interrupters 70 is attached at its lower end to a supporting insulator 79 mounted on a housing 80, which is suitably fixed to the base 10 of the incoming line compartment 7. Although only one insulating support member 72 is shown, it is to be understood that additional support members of a similar construction are mounted at circumferentially spaced points about the vacuum interrupters to provide additional support therefor.

For operating the vacuum interrupters of all three phases, a suitable mechanism (not shown) common to all three phases is provided within housing 80. For connecting this mechanism to the movable contact rods of the interrupters, three linkages 82, one for each phase, are provided. Each of these linkages 82 is of a conventional design, is principally of insulating material, and is connected between the mechanism and the interrupters in one phase of the vacuum switch. In the schematic form shown in the drawing, each of these linkages 82 comprises an insulating operating rod 83 suitably connected at its lower end to the operating mechanism and a lever 84 to which the operating rod is pivotally connected at its upper end. Lever 84 is pivotally mounted on a fulcrum 85 suitably fixed to the support 72. Lever 84 is connected to one contact rod through a link 87 and to the other contact rod through a link 88. When the operating rod 83 is driven upwardly by the mechanism, it pivots lever 84 clockwise to simultaneously open the two interrupters. Conversely, when operating rod 83 is driven downwardly by the mechanism, it pivots lever 84 counterclockwise to simultaneously close the two interrupters. The details of this linkage form no part of the present invention, and for this reason the linkage is shown in schematic form only.

Each interrupter assembly of the vacuum switch may be though of as having two vertically spaced electrical terminals 90 and 92. When the interrupters are closed, a conductive path extends between the two terminals 90 and 92 through the contacts 75, 76 of the two interrupters and through a flexible conductive braid 94 which electrically interconnects the two movable contact rods.

INTERCONNECTION OF COMPONENTS OF INCOMING LINE EQUIPMENT

In each phase of the power circuit, the cable terminal 30, the isolating switch 50, and the vacuum switch 52 are electrically connected in series with each other and with transformer terminal 46. For effecting this series connection, we provide conductors 95, 96 and 97. The first conductor 95 is connected between cable terminal 30 and one of the contacts 56 of isolating switch 50. The second conductor 96 is connected between the other contact 57 of the isolating switch 50 and the upper terminal 90 of vacuum switch 52. The remaining conductor 97 is connected between lower terminal 92 of the vacuum switch and transformer terminal structure 46. Conductor 97 is an L-shaped member extending alongside the vacuum interrupters 70 and supported intermediate its length by a post type insulator 98. The left hand end of this insulator 98 is mounted on the left hand wall 100 of the incoming line compartment, and the conductor 97 is suitably attached to the right hand end of this insulator.

ENTRY INTO INCOMING LINE COMPARTMENT

It is sometimes necessary to enter the incoming line compartment 7 in order to inspect the vacuum interrupters 70 and to make suitable adjustments to compensate for any contact wear which might have taken place. To afford access to the interrupters, a horizontally extending aisle 102 (FIG. 3) is provided. This aisle 102 is located between the incoming cable 20, 21, 22 and the vacuum switch 52 and beneath the horizontal plane in which the blade 59 of the isolating switch moves. The cables normally will remain energized during this inspection and maintenance period and it is therefore important for safety reasons that access to the cables from the aisle be blocked. This blocking is accomplished by a vertical barrier 104 at one side of the aisle between the aisle and the cables. The opposite side of the aisle is generally open to permit easy access to the vacuum interrupters. Barrier 104 is primarily of metal, but its upper end portion 104a is of a suitable insulating material to avoid unduly reducing the electrical clearances around the live parts of isolating switch 50.

Entry to the aisle 102 is afforded through an outer door 106 in the front wall of the incoming line compartment. This door, however, does not open directly into the aisle 102, but rather opens into a vestibule 108, where controls (not shown) for the isolating switch 50 and vacuum switch 52 are located. Between this vestibule 108 and the aisle 102, there is an inner door 109 that blocks entry into the aisle so long as it remains closed. Suitable interlocks, schematically shown at 111 in FIG. 3 but not illustrated in detail, prevent this inner door 109 from being opened unless all circuit breakers (such as 11 in FIG. 1a) on the low voltage side of the transformer are opened and unless the isolating switch 50 and the vacuum switch 52 are opened by means of the controls located in the vestibule. Assuming that the circuit breakers 11 on the low voltage side have been opened; when the controls within the vestibule are operated to open the switches 50 and 52, the inner door can then be opened and the aisle 102 can then be entered to permit the necessary inspection and maintenance work to be performed.

Figure 3:
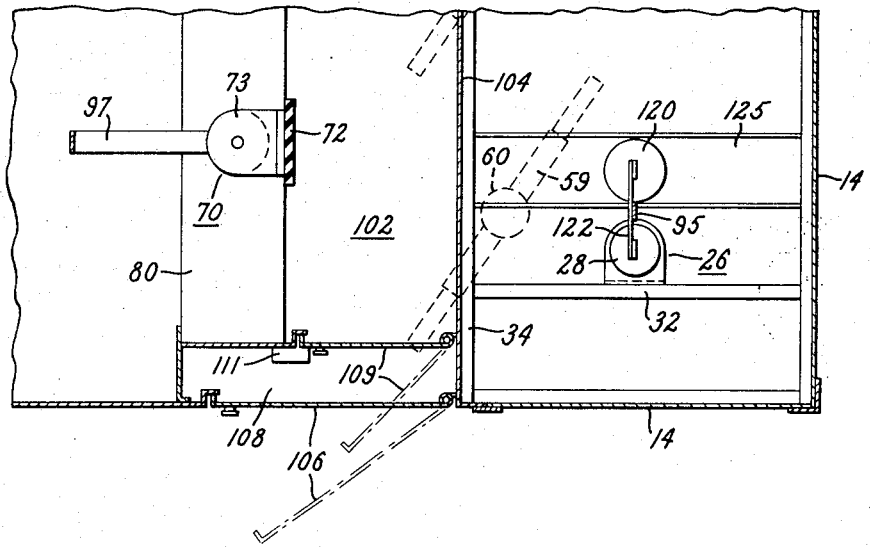
FIG. 3 is a sectional view along the line 3—3 of FIG. 1.

Above the inner door there is a vertical insulating barrier 110 in the same plane as the closed door that prevents an unskilled operator from reaching over the door into the interior of compartment 7. This vertical barrier 110, however, terminates short of the roof of the compartment, leaving a space above the barrier. When isolating switch 50 is opened, the tip of the switch blade 59 projects slightly beyond this vertical barrier 110, as is indicated in FIG. 3, thereby providing the operator with a positive visual indication that the isolating switch 50 is open. Preferably, the inner door 109 contains a transparent window 113 which permits the operator to look into compartment 7 and satisfy himself that all the switching assemblies of switch 50 are open before he enters aisle 102.

LIGHTNING ARRESTORS 120

To protect the transformer and other equipment from lightning surges that might enter via the incoming line 20, 21 and 22, suitable lightning arrestors 120 of a conventional form are provided, one for each line conductor. As shown in FIGS. 1 and 2, the upper terminal of each arrestor 120 is electrically connected through a conductor 122 to the terminal 30 of its associated cable, and the lower terminal of the arrestor is suitably electrically connected to ground. Each arrestor is mechanically supported on one of three horizontal beams 125 that extend beneath the arrestors. These arrestors are preferably located in positions intermediate the incoming line conductors 20, 21 and 22 approximately in line with the terminators 26, thus requiring no extra electrical clearance space in the incoming line compartment in a direction perpendicular to the aisle 102.

GENERAL DISCUSSION

It will be apparent from the above description that all of the incoming line equipment is enclosed within metal enclosure 12, 14, 100 of the incoming line equipment. This enclosure protects the incoming line equipment from adverse weather conditions which could impair its electrical insulating characteristics. This allows smaller electrical clearances and shorter creepage distances to be relied upon for the necessary insulation, thus contributing to the compactness of the substation.

Another feature contributing to the compactness of the substation is that the interruption of magnetizing currents, load currents, and even moderate fault currents is effected by vacuum switch 52. Any such interruptions are effected within the sealed housings 74 of the vacuum switch, thereby completely confining the arcing products and preventing their escape into the surrounding insulating space. Thus, this surrounding insulating space remains unimpaired by such arcing products, eliminating the need that would otherwise be present to increase it by large safety margins to compensate for impairment by arcing products.

By suspending the isolating switch 50 from structure located near the roof of the incoming line compartment 7 and by locating the inspection aisle 102 beneath the isolating switch and horizontally between cables 20, 21, 22 and the vacuum switch 52, we have provided a very compact arrangement of this equipment which requires little extra space to accommodate the inspection aisle. When isolating switch 50 and vacuum switch 52 are energized, space within the aisle 102 is serving to provide electrical clearance space for isolating high potential parts of these switches from structure at ground and other different potentials. Since vacuum switch 52 and most of switch 50 are maintained deenergized when maintenance personnel is inside the aisle 102, this electrical clearance afforded by the aisle is not then needed.

The inverted, or suspended, character of switch 50 also contributes to compactness because it eliminates the need for providing electrical clearance space above the high voltage parts 56, 57, 59 of the switch beyond that which is needed anyway to isolate these parts from the switch base 54.

Another feature contributing to compactness of the incoming line compartment 7 is the disposition of the transformer bushings 40 in a nearly horizontal position. Had the bushings been vertically arranged in the usual manner, then considerably greater height would be required to accommodate them and to accommodate the conductors 97 leading to tnem. In the disclosed embodiment, the roof 130 of the transformer tank serves also as a portion of the roof of the transformer compartment. A suitable filler piece 132 excludes foreign objects from the space between the transformer wall and the wall 100 of the incoming line compartment 7.

Still another feature contributing to compactness in the illustrated preferred embodiment is the double break design of the isolating switch. If instead of this double break design, a conventional single break switch were used, the operating insulator (such as 60) would typically be located in a position outside the space intermediate the two contact-supporting insulators 58 and 58a and the blade would have to move through a longer stroke to achieve the same total gap length, both of which characteristics could result in additional space being consumed. Also the fact that our blades 59 move in a horizontal plane contributes to a conservation of vertical space. Some increase in horizontal space is necessary to accommodate a horizontally movable blade, but this increase is relatively moderate since much of this horizontal space is needed anyway to accommodate the lightning arrestors 120 which are connected to each incoming line conductor.

The outer door 106 is provided with a suitable lock (not shown) that prevents any unauthorized person from gaining access to the controls in the vestibule 108 and from entering the incoming line compartment. There is normally no need to provide the usual protective fence around the substation since the substation has no exposed high potential parts outside of its metal enclosure. All incoming lines enter the substation underground and all outgoing lines are also underground. All incoming line equipment is within the metal enclosure of the incoming line compartment 7, and so long as the door 106 is locked, no access can be had thereto by unauthorized person. Further assurance against unauthorized entry is had by making all bolts, screws, and hinges in the housing 12, 14, 100 of such a design that they can be removed only by operations performed inside the housing.

The incoming line compartment 7 will normally be too large to ship from the factory as a single unit, but most of it normally can be divided into two subassemblies, each of which can be shipped almost fully assembled (apart from the incoming cables 20, 21 and 22, which are at the customer's site). To permit this division into two subassemblies, a horizontal split is provided at 140 and a vertical split at 142. The portion of the incoming line compartment above the horizontal split 140 and to the right of the vertical split 142 can be shipped as one subassembly and that below 140 and to the right of 142 as a second subassembly. The entire base 10 goes with the second assembly. The interconnecting conductors 95, 96 and 97 are removed to permit this division. The two subassemblies are reassembled together at the field site, following which the conductors 95, 96 and 97 are added to electrically connect the major components as shown. The split at 140 allows the portion of the roof 12 and the sidewalls 14 and 100 of the compartment 7 which are located to the left of split 142 to be removed in order to facilitate location of the incoming line compartment 7 in its illustrated position next to a transformer without interference from the projecting bushings of the transformer.

While we have shown and described a particular embodiment of our invention, it will be obvious to those skilled in the art that various changes and modifications may be made without departing from our invention in its broader aspects; and we, therefore, intend herein to cover all such changes and modifications as fall within the true spirit and scope of our invention.

What we claim as new and desire to secure by Letters Patent of the United States is:

1. An incoming line compartment for an electric power distribution substation comprising:
   a. a housing comprising a base, a roof, and metal walls extending vertically between said base and roof,
   b. a cable projecting upwardly through said base and having a terminal at its upper end within said housing,
   c. electrical apparatus terminal structure within said housing,
   d. an isolating switch within said housing comprising: a switch base mounted near said roof, a contact, an insulator extending downwardly from said switch base and mounting said contact on said switch base in a position beneath said switch base, a generally horizontally extending blade for engaging said contact when said switch is closed, insulating means mounting said blade on said switch base for pivotal motion in a generally horizontal plane about a generally vertical axis, thus allowing said blade to be moved into an open position wherein a gap is established between said blade and said contact,
   e. a vacuum switch within said housing comprising a plurality of vacuum interrupters arranged one above the other and means for supporting said interrupters on said housing base in a location horizontally spaced from said cable, said vacuum switch comprising a pair of vertically spaced terminals between which a conductive path extends through said interrupters when said vacuum switch is closed,
   f. and means for electrically connecting said cable terminal, said isolating switch, and said vacuum switch in series with each other and with said electrical apparatus terminal structure comprising: a conductor connecting said cable terminal with said contact, an additional conductor connecting said blade with one terminal of said vacuum switch, and still another conductor connecting the other terminal of said vacuum switch with said electrical apparatus terminal structure.

2. The incoming line compartment of claim 1 in which:
   a. said isolating switch is a double break switch comprising a second contact in addition to the first contact of claim 1 and another insulator mounting said second contact on said switch base in a position beneath said switch base and horizontally spaced from said first contact, and
   b. said blade interconnects said contacts when the switch is closed and is mounted by said insulating means for pivotal motion in said generally horizontal plane about a generally vertical axis located between said contacts, thus allowing said blade to be pivoted out of its closed position into an open position wherein two gaps are established, one between each of said contacts and said blade.

3. An incoming line compartment as defined in claim 1 and further comprising:
   a. an aisle located between said cable and said vacuum switch in a location beneath the generally horizontal plane in which said blade moves,
   b. a barrier between said aisle and said cable for blocking access to said cable from said aisle,
   c. said vacuum interrupters being accessible from said aisle, whereby to allow inspection of said vacuum interrupters from said aisle, and
   d. a door in one of said metal walls openable to afford access to said aisle.

4. An incoming line compartment as defined in claim 3 in which said door is an outer door and which further comprises:
   a. a vestibule located between said outer door and said aisle,
   b. an inner door between said vestibule and said aisle blocking entry from said vestibule into said aisle until said inner door is opened,
   c. control means located within said vestibule and operable to open said isolating switch,
   d. and interlock means requiring said control means to be operated to open said isolating switch before said inner door can be opened to permit entry into said aisle from said vestibule.

5. An incoming line compartment for a three-phase electric power distribution substation comprising:
   a. a housing comprising a base, a roof, and metal walls extending vertically between said base and said roof,
   b. three spaced-apart cables, one for each phase, projecting upwardly through said base and each having a terminal at its upper end within said housing,
   c. three spaced-apart terminal structures for three-phase electrical apparatus, one terminal structure for each phase, located within said housing,
   d. a three-phase isolating switch within said housing comprising a switch base mounted near said roof and three spaced-apart switching assemblies, one for each phase, mounted on said switch base; each switching assembly comprising: a contact, an insulator extending downwardly from said switch base and mounting said contact on said switch base in a position beneath said switch base, a generally horizontally extending blade for engaging said contact when said switch is closed, insulating means mounting said blade on said switch base for pivotal motion in a generally horizontal plane about a generally vertical axis, thus allowing said blade to be moved to an open position wherein a gap is established between said blade and said contact, and means for mechanically coupling said blades together for opening movement in unison and for closing movement in unison,
   e. a three-phase vacuum switch within said housing comprising three spaced-apart interrupting assemblies, one for each phase; each interrupting assembly comprising a plurality of vacuum interrupters arranged one above the other and means for supporting said vacuum interrupters on said housing base in a location horizontally-spaced from said cables, each interrupting assembly comprising a pair of vertically spaced terminals between which a conductive path extends through said interrupters of said assembly when the vacuum switch is closed,
   f. means for electrically connecting in series in each phase one of said cable terminals, one of said switching assemblies, one of said interrupting assemblies, and one of said apparatus terminal structures, comprising: a conductor connecting said one cable terminal with said contact of said one switching assembly, an additional conductor connecting said blade of said one switching assembly with one terminal of said one interrupting assembly, and still another conductor connecting the other terminal of said interrupting assembly with said one apparatus terminal structure.

6. The incoming line compartment of claim 5 in which:
   a. said isolating switch is a double-break switch and each switching assembly comprises: a second contact in addition to the first contact of claim 5 and another insulator mounting said second contact on said switch base in a position beneath said switch base and horizontally spaced from said first contact, and
   b. the blade of each switching assembly interconnects it contacts when the switch is closed, and is mounted by said insulating means for pivotal motion in said generally horizontal plane about a generally vertically extending axis located between said contacts.

7. An incoming line compartment as defined in claim 5 and further comprising:
   a. an aisle located between said three cables and said three interrupter assemblies in a location beneath the generally horizontal plane in which said blades move,
   b. a barrier between said aisle and said three cables for blocking access to said cables from said aisle,
   c. said interrupting assemblies being accessible from said aisle, whereby to allow inspection of said interrupting assemblies from said aisle, and
   d. a door in one of said metal walls openable to afford access to said aisle.

8. An incoming line compartment as defined in claim 7 in which said door is an outer door and which further comprises:
   a. a vestibule located between said outer door and said aisle,
   b. an inner door between said vestibule and said aisle blocking entry from said vestibule into said aisle until said inner door is open,
   c. control means located within said vestibule and operable to open said isolating switch,
   d. and interlock means requiring said control means to be operated to open said isolating switch before said inner door can be opened to permit entry into said aisle from said vestibule.

9. An electric power substation comprising;
   a. the incoming line compartment of claim 1,
   b. a transformer space located immediately adjacent said incoming line compartment,
   c. a transformer comprising a tank located within said transformer space and a high voltage lead-in bushing extending generally horizontally through said tank and into said incoming line compartment,
   d. said high voltage bushing having at its outer end the terminal structure of (c) claim 1.

* * * * *